(12) United States Patent
Lee

(10) Patent No.: US 7,147,248 B2
(45) Date of Patent: Dec. 12, 2006

(54) PASSENGER AIR BAG SYSTEM FOR VEHICLES

(75) Inventor: Jung Su Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 242 days.

(21) Appl. No.: 10/702,542

(22) Filed: Nov. 7, 2003

(65) Prior Publication Data
US 2005/0082806 A1  Apr. 21, 2005

(30) Foreign Application Priority Data
Oct. 17, 2003  (KR) ...................... 10-2003-0072620

(51) Int. Cl.
*B60R 21/26* (2006.01)
(52) U.S. Cl. ...................... 280/740; 280/729
(58) Field of Classification Search ................ 280/742, 280/739, 729, 740
See application file for complete search history.

(56) References Cited
U.S. PATENT DOCUMENTS

| | | | | |
|---|---|---|---|---|
| 5,246,250 A | * | 9/1993 | Wolanin et al. ............. | 280/739 |
| 5,607,179 A | * | 3/1997 | Lenart et al. ............. | 280/728.2 |
| 5,788,269 A | * | 8/1998 | Jakovski et al. ......... | 280/728.2 |
| 5,913,535 A | * | 6/1999 | Taguchi et al. ............. | 280/729 |
| 5,951,038 A | * | 9/1999 | Taguchi et al. ............. | 280/729 |
| 6,283,499 B1 | * | 9/2001 | Nelsen et al. ............... | 280/729 |
| 6,361,067 B1 | * | 3/2002 | Varcus et al. ............... | 280/729 |
| 6,382,662 B1 | * | 5/2002 | Igawa ........................ | 280/729 |
| 6,585,290 B1 | * | 7/2003 | Pinsenschaum et al. .... | 280/740 |

\* cited by examiner

*Primary Examiner*—David R. Dunn
*Assistant Examiner*—Drew J. Brown
(74) *Attorney, Agent, or Firm*—Greenblum & Bernstein, P.L.C.

(57) ABSTRACT

A passenger air bag system for a vehicle includes an air bag housing mountable to a front of an instrument panel, an inflator provided in the air bag housing to discharge gas when the vehicle collides, a cushion accommodated in the air bag housing such that the cushion is expanded to a passenger sitting in a passenger seat by the gas discharged from the inflator, a retainer attached to the air bag housing to support the cushion, a diffuser bag fixed to an inlet part of the cushion, the diffuser bag receiving gas through the inlet part of the cushion and comprising a plurality of gas-discharging holes formed at both sides thereof to discharge gas introduced thereinto into the cushion, and a single gas-guiding hole provided on the retainer.

11 Claims, 5 Drawing Sheets

PASSENGER AIR BAG SYSTEM FOR VEHICLES

RELATED APPLICATIONS

The present disclosure relates to subject matter contained in Korean Application No. 10-2003-72620, filed on Oct. 17, 2003, which is herein expressly incorporated by reference in its entirety.

BACKGROUND OF THE INVENTION

1. Field of the Invention

The present invention relates to an air bag system for vehicles, and more particularly to a passenger air bag system for vehicles, which is capable of preventing eccentric expansion of a cushion when a collision of the vehicle occurs by improvement of the structure of the cushion.

2. Description of the Related Art

Generally, an air bag system for vehicles is mounted in front of a driver seat or a passenger seat in such a manner that a cushion of the air bag system is instantly expanded when a collision of the vehicle occurs for protecting a driver or a passenger from injury.

The air bag systems may be classified into a driver air bag system and a passenger air bag system. The driver air bag system is mounted to the steering wheel of the vehicle for protecting the driver from injury. The passenger air bag system is mounted to an instrument panel of the vehicle disposed in front of the passenger seat for protecting the passenger from injury. Basically, the driver air bag system is requisite, and the passenger air bag system is optional; however, vehicles with passenger air bag systems basically mounted therein for protecting passengers from injury are on the increase in recent years.

FIG. 1 is an exploded perspective view showing a conventional passenger air bag system, FIG. 2 is a longitudinal sectional view showing the conventional passenger air bag system, and FIG. 3 is a perspective view, partially cutaway, showing a cushion of the conventional passenger air bag system.

As shown in FIGS. 1 to 3, the conventional passenger air bag system for vehicles comprises: an air bag housing 4 mounted to an instrument panel 2; an inflator 6 attached to the rear part of the air bag housing 4 for discharging gas when a collision of the vehicle occurs; a cushion 8 accommodated in the front part of the air bag housing 4 such that the cushion 8 is expanded to the front of a passenger seat by means of gas discharged from the inflator 6; and a retainer 10 attached to the air bag housing 4 for supporting the cushion 8, the retainer 10 having a plurality of gas-guiding holes 10a for guiding gas discharged from the inflator 6 to the cushion 8.

The air bag housing 4 comprises: a cushion housing 12 formed in the shape of a box with the front part opened so that the cushion 8 is accommodated in the cushion housing 12 while being folded; and a can housing 14 connected to the rear part of the cushion housing 12, in which the inflator 6 is disposed.

The cushion housing 12 is provided along both longitudinal sides at the front part thereof with flanges 12a, respectively, which are fixed to the rear part of the instrument panel 2 by means of bolts. The can housing 14 is connected to the rear part of the cushion housing 12 in such a manner that the can housing 14 communicates with the cushion housing 12. The can housing 14 is fixed to a cowl cross member (not shown) disposed in the instrument panel 2 by means of a mounting bracket (not shown).

The inflator 6 is formed in the shape of a cylinder. The inflator 6 is provided on the outer circumference at one side thereof with a plurality of gas-discharging holes 16 for discharging gas when a collision of the vehicle occurs.

At one end of the inflator 6 is formed a fixing protrusion 18 having a male screw thread part formed on the outer circumference thereof, on which a fixing nut 20 is rotatably fitted so that the inflator 6 is attached to the side of the can housing 14. At the other end of the inflator 6 is formed a connector-connecting member 22 in such a manner that the connector-connecting member 22 is protruded outwardly. To the inflator 6 is connected a connector 24, by which the inflator 6 is linked to an external device, through the connector-connecting member 22.

As shown in FIG. 3, the cushion 8 comprises: a main panel 28 formed in the shape of a cylinder and having an inlet part 26 formed at one side thereof, the inlet part 26 of the main panel 28 being fixed to the can housing 14 by means of the retainer 8; side panels 30 attached to both open sides of the main panel 28 by means of sewing, respectively; and a tether 32 having one end fixed to the inlet part 26 of the main panel 28 and the other end fixed to the inner side of the main panel 28, which is opposite to the inlet part 26 of the main panel 28.

The main panel 28 is formed in such a manner that a long strip is rolled in the shape of a cylinder and then stitched. The main panel 28 is the front part of the cushion 8, which approaches a passenger when the cushion 8 is expanded. To the sides of the main panel 28 are attached the side panels 30 by means of sewing, respectively.

Each of the side panels 30 has a ventilation hole 30a formed at a prescribed part thereof for discharging gas introduced into the cushion 8 to the outside. When the passenger contacts the cushion 8 due to the impact caused when a collision of the vehicle occurs, the gas in the cushion 8 is discharged to the outside through the ventilation hole 30a so that shock transmitted to the passenger is effectively absorbed.

The tether 32 is formed in the shape of a long strip. One end of the tether 32 is fixed to the inlet part 26 of the main panel 28, and the other end of the tether 32 is fixed to the inner side of the cushion 8 opposite to the inlet part 26 of the main panel 28, by which the shape of the expanding cushion 8 is determined.

Specifically, both ends of the tether 32 are fixed to the inlet part 26 and the front part of the cushion 8, whereby the expanded length of the cushion 8 is restricted. Consequently, it is possible to prevent a bag slip phenomenon in which the passenger is injured due to the expanding pressure of the cushion 8.

The retainer 10 is attached to the can housing 14 together with the cushion 8 by means of bolts such that the plurality of gas-guiding holes 10a formed at the center of the retainer 10 communicate with the inlet part 26 of the cushion 8. The retainer 10 serves to support the cushion 8 so that the cushion 8 is not separated from the can housing 14 due to the pressure of the gas when the cushion 8 is expanded.

The operation of the conventional passenger air bag system with the above-stated construction will now be described. When a collision of the vehicle occurs, an operation signal is transmitted to the inflator 6 via the connecter 24, and then the inflator 6 is exploded by means of electric current supplied to the inflator 6 for discharging gas through the gas-discharging holes 16.

The gas discharged from the inflator 6 flows along the can housing 14 so that the gas is supplied into the cushion 8 through the gas-guiding holes 10*a* of the retainer 10. The cushion 8 is expanded to the front of the cushion housing 12 by means of the gas supplied into the cushion 8.

The instrument panel 2 is broken by means of the cushion 8 expanded as described above. Subsequently, the cushion 8 is expanded toward a passenger seated in the passenger seat, whereby shock transmitted to the passenger is effectively absorbed, and thus injury to the passenger is minimized.

In the conventional passenger air bag system for vehicles, however, the inflator 6 is horizontally disposed in the can housing 14, and the gas-discharging holes 16 are provided adjacent to one end of the inflator 6. As a result, the cushion 8 is eccentrically expanded by means of the gas discharged from the inflator 6 when a collision of the vehicle occurs.

In order to solve the eccentric expansion of the cushion 8 as described above, there has been proposed a method for modifying the gas-guiding holes 10*a* of the retainer 10 recently. Specifically, the plurality of gas-guiding holes 10*a* with different sizes are formed at the retainer 10 while being appropriately arranged so that the gas discharged from the inflator 6 is uniformly supplied to the cushion 8 while the gas flows through the gas-guiding holes 10*a* of the retainer 10, whereby the eccentric expansion of the cushion 8 is prevented.

In the case that the shapes of the gas-guiding holes 10*a* of the retainer 10 are changed in order to prevent the eccentric expansion of the cushion 8, however, it is required that a plurality of new retainers 10 be manufactured depending upon various kinds of air bag systems, and thus a plurality of molds, which are used for the respective retainers 10, become necessary. Consequently, the cost and time of manufacturing retainers are increased. The cost of testing the manufactured retainers is also incurred.

Furthermore, the retainer 10 causes flow resistance when the gas discharged from the inflator 6 passes through the gas-guiding holes 10*a* of the retainer 10. As a result, the time required to fully expand the cushion 8 is increased.

SUMMARY OF THE INVENTION

Therefore, the present invention has been made in view of the above problems, and it is an object of the present invention to provide a passenger air bag system for vehicles having a diffuser bag mounted in a cushion so that gas is not eccentrically supplied into the cushion through the inlet part of the cushion, and thus the cushion is expanded with a correct shape without eccentric expansion when a collision of the vehicle occurs, whereby performance of the air bag system is improved.

In accordance with the present invention, the above and other objects can be accomplished by the provision of a passenger air bag system for vehicles, comprising: an air bag housing mounted to an instrument panel at the front part thereof; an inflator mounted in the air bag housing for discharging gas when a collision of the vehicle occurs; a cushion accommodated in the air bag housing such that the cushion is expanded to the front of a passenger seated in a passenger seat by means of the gas discharged form the inflator; a retainer attached to the air bag housing for supporting the cushion; and a diffuser bag fixed to an inlet part of the cushion while the diffuser bag communicates with the inlet part of the cushion, the diffuser bag having openings formed at both sides thereof for changing the flow direction of the gas introduced into the cushion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
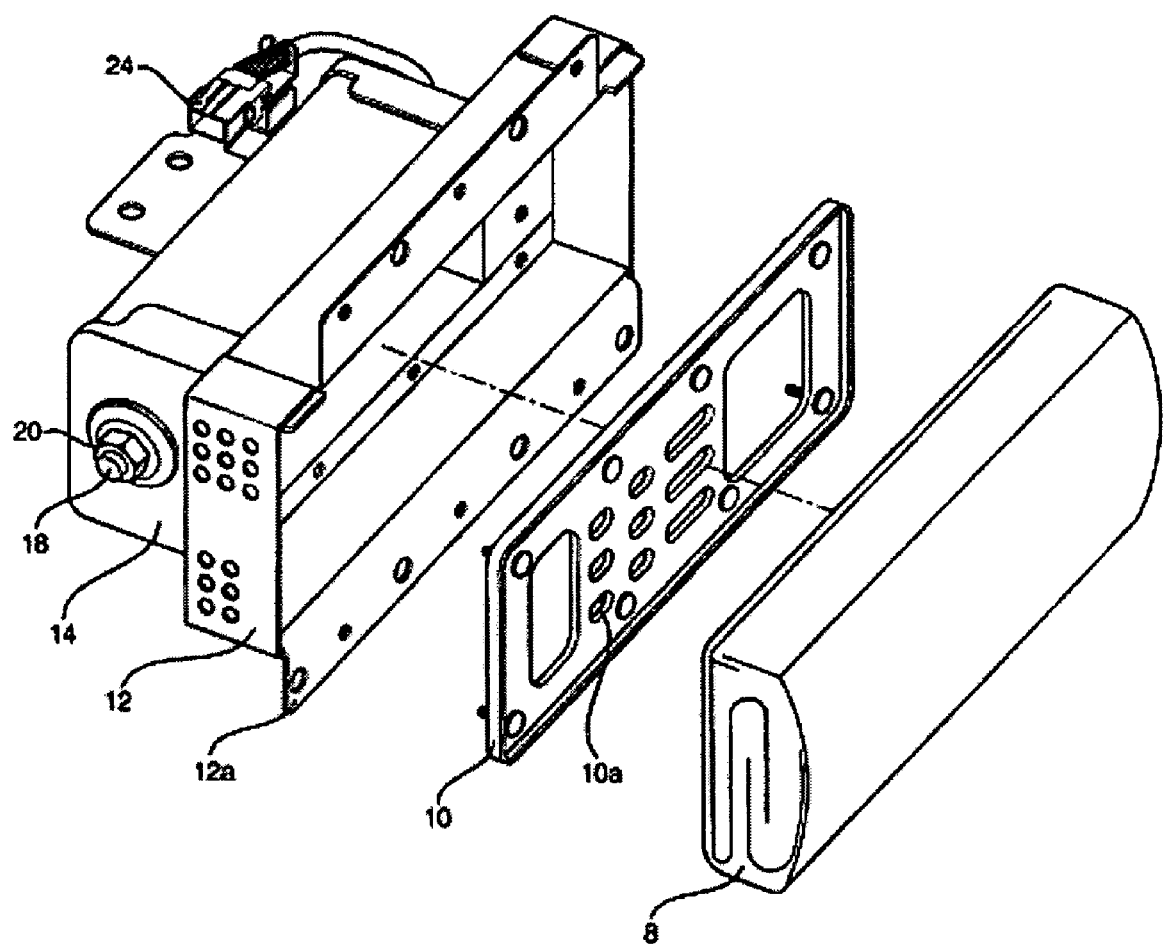
FIG. 1 is an exploded perspective view showing a conventional passenger air bag system.
Figure 2:
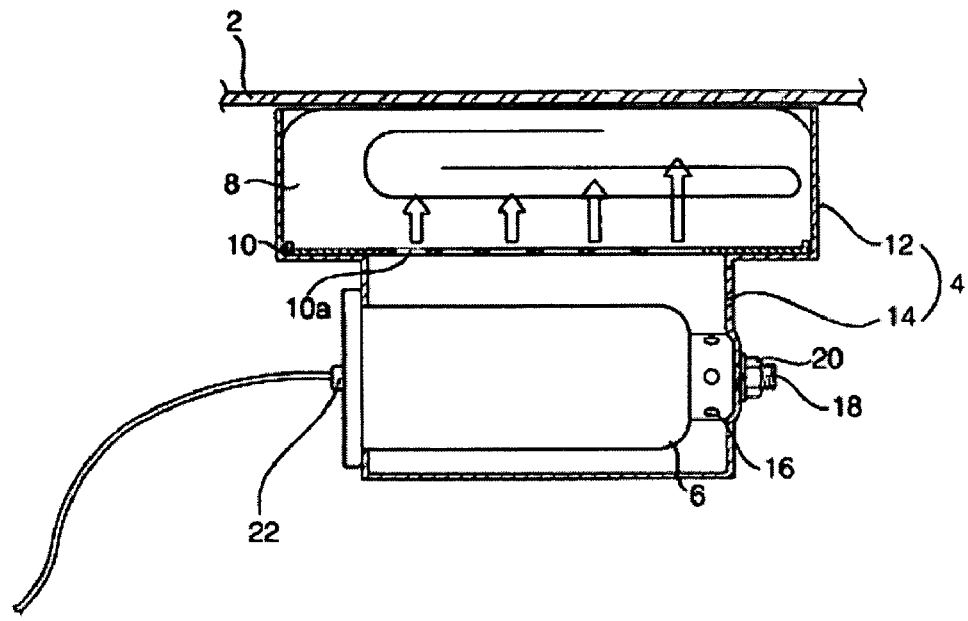
FIG. 2 is a longitudinal sectional view showing the conventional passenger air bag system.
Figure 3:
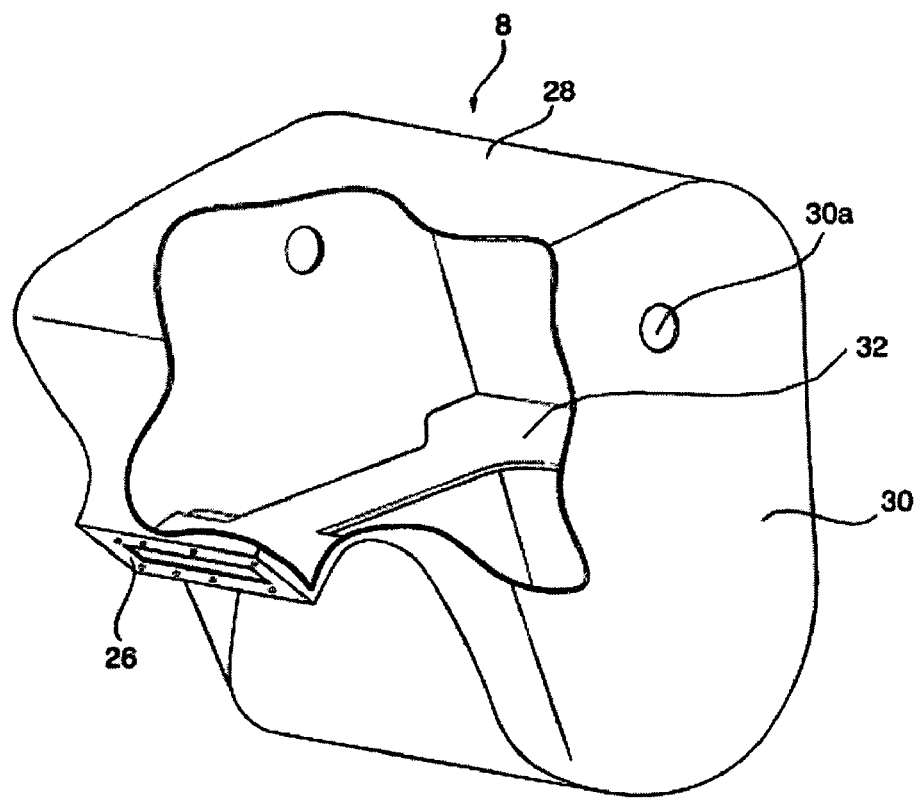
FIG. 3 is a perspective view, partially cutaway, showing a cushion of the conventional passenger air bag system.
Figure 4:
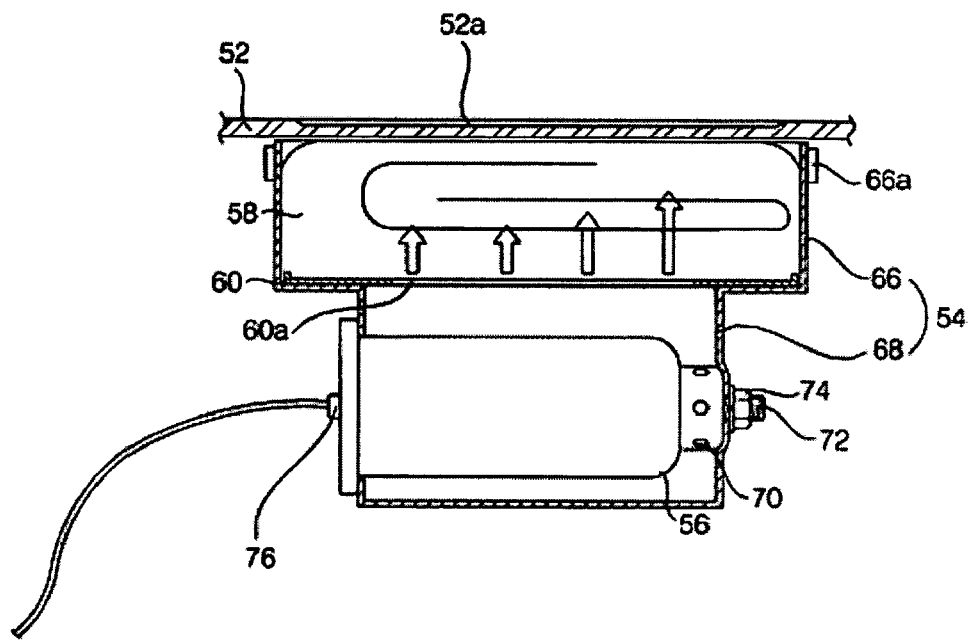
FIG. 4 is a longitudinal sectional view showing a passenger air bag system according to a preferred embodiment of the present invention.
Figure 5:
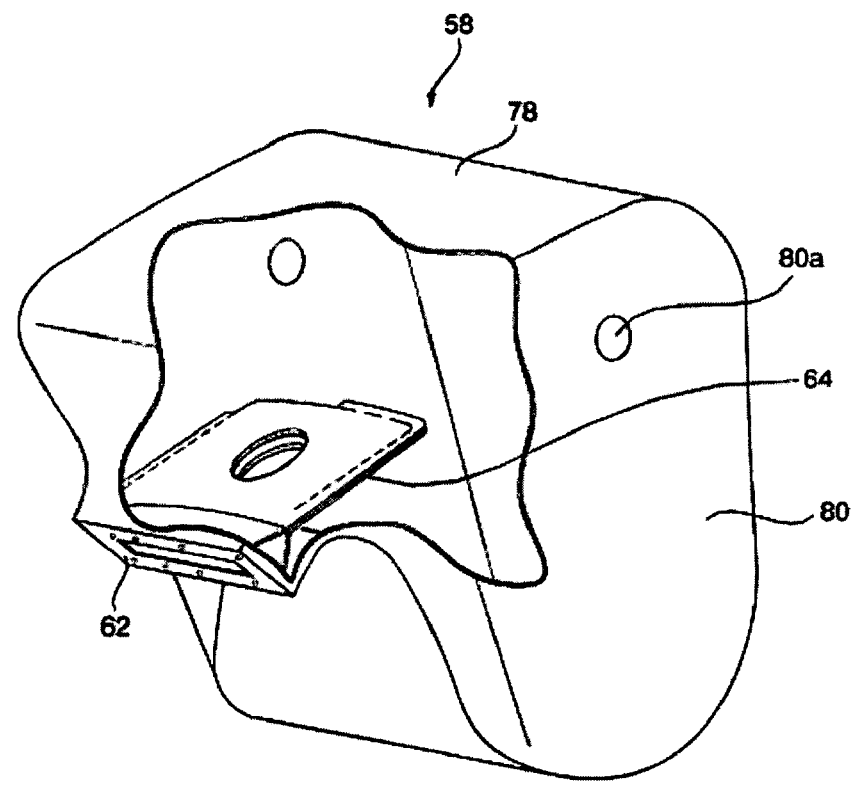
FIG. 5 is a perspective view, partially cutaway, showing a cushion of the passenger air bag system according to the preferred embodiment of the present invention.
Figure 6:
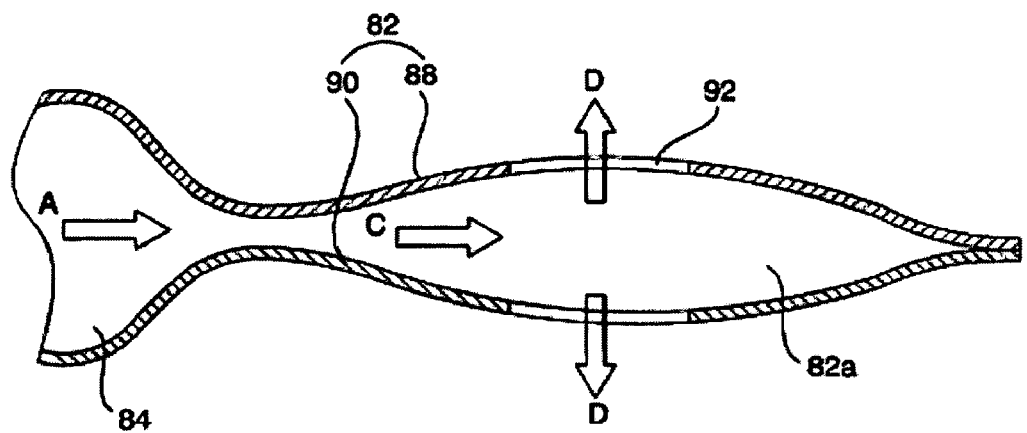
FIG. 6 is a longitudinal sectional view illustrating the operation of a diffuser bag of the passenger air bag system according to the preferred embodiment of the present invention.
Figure 7:
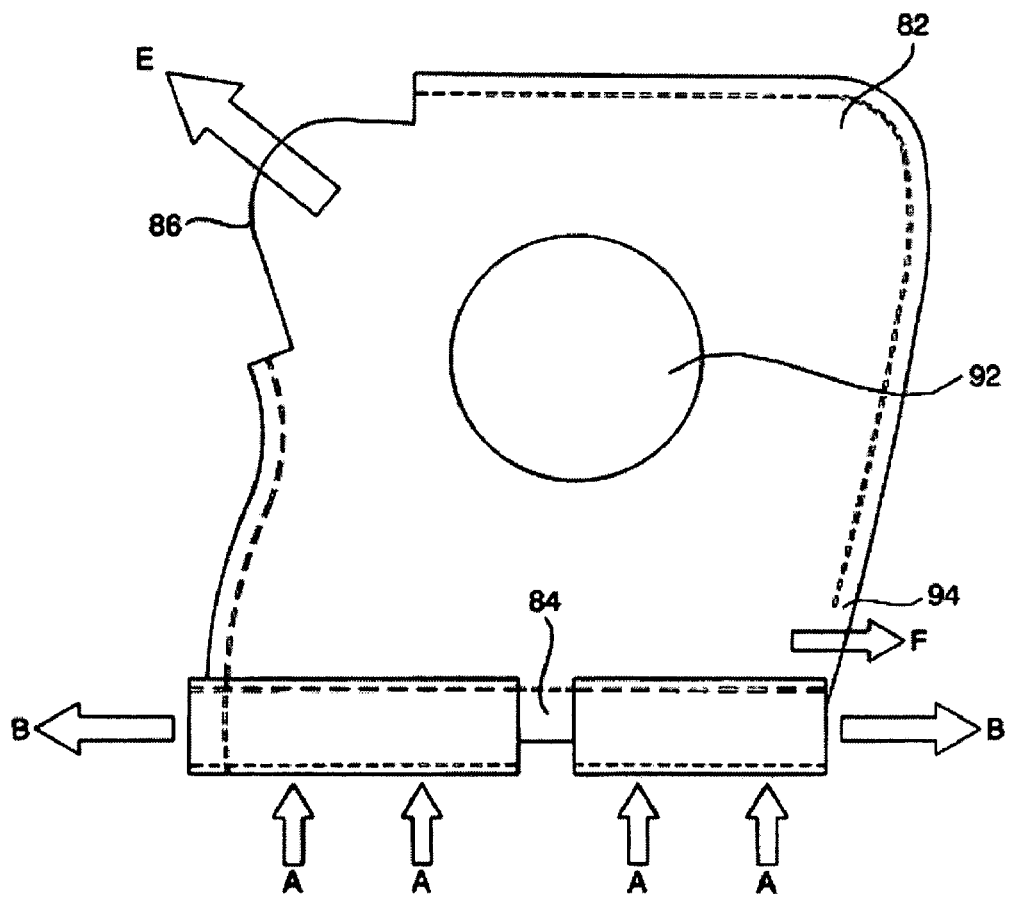
FIG. 7 is a plan view illustrating the operation of the diffuser bag of the passenger air bag system according to the preferred embodiment of the present invention.

FIG. 4 is a longitudinal sectional view showing a passenger air bag system according to a preferred embodiment of the present invention, FIG. 5 is a perspective view, partially cutaway, showing a cushion of the passenger air bag system according to the preferred embodiment of the present invention, FIG. 6 is a longitudinal sectional view illustrating the operation of a diffuser bag of the passenger air bag system according to the preferred embodiment of the present invention, and FIG. 7 is a plan view illustrating the operation of the diffuser bag of the passenger air bag system according to the preferred embodiment of the present invention.

As shown in FIGS. 4 to 7, the passenger air bag system for vehicles according to the present invention comprises: an air bag housing 54 mounted to an instrument panel 52 at the front part thereof; an inflator 56 horizontally disposed in the air bag housing 54 for discharging gas when a collision of the vehicle occurs; a cushion 58 accommodated in the air bag housing 54 such that the cushion 58 is expanded to the front of a passenger seated in a passenger seat by means of the gas discharged from the inflator 56; a retainer 60 attached to the air bag housing 54 for supporting the cushion 58; and a diffuser bag 64 fixed to an inlet part 62 of the cushion 58 while the diffuser bag 64 communicates with the inlet part 62 of the cushion 58 for changing the flow direction of the gas such that the gas is not eccentrically introduced into the cushion 58.

The air bag housing 54 comprises: a cushion housing 66 formed in the shape of a box with the front part opened so that the cushion 58 is accommodated in the cushion housing 66 while being folded; and a can housing 68 connected to the rear part of the cushion housing 66, in which the inflator 56 is disposed.

The cushion housing 66 is provided along both longitudinal sides at the front part thereof with flanges, respectively, which are fixed to the rear part of the instrument panel 52 by means of bolts. At the instrument panel 52 is formed a cut line 52a, by which the instrument panel 52 is easily broken when the cushion 58 is expanded.

The can housing 68 is connected to the rear part of the cushion housing 66 in such a manner that the can housing 68 communicates with the cushion housing 66. The can housing 68 is fixed to a cowl cross member (not shown) disposed in the instrument panel 52 by means of a mounting bracket (not shown).

The inflator 56 is formed in the shape of a cylinder. The inflator 56 is horizontally disposed in the can housing 68. The inflator 56 is provided on the outer circumference at one side thereof with a plurality of gas-discharging holes 70 for discharging gas when a collision of the vehicle occurs.

At one end of the inflator 56 is formed a fixing protrusion 72 having a male screw thread part formed on the outer circumference thereof, on which a fixing nut 74 is rotatably fitted so that the inflator 56 is attached to the side of the can housing 68. At the other end of the inflator 56 is formed a connector-connecting member 76 in such a manner that the connector-connecting member 76 is protruded outwardly. To the inflator 56 is connected a connector (not shown), by which the inflator 56 is linked to an external device, through the connector-connecting member 76. The connector is disposed at the outside of the air bag housing 54. One end of the connector is connected to the connector-connecting member 76, and the other end of the connector is connected to an electronic control unit and a power supply terminal.

The cushion 58 comprises: a main panel 78 formed in the shape of a cylinder and having the inlet part 62 formed at one side thereof, the inlet part 62 of the main panel 78 being fixed by means of the retainer 60; and side panels 80 attached to both open sides of the main panel 78 by means of sewing, respectively.

The main panel 78 is formed in such a manner that a long strip is rolled in the shape of a cylinder and then stitched. The main panel 78 is the front part of the cushion 58, which approaches a passenger when the cushion 58 is expanded. To the sides of the main panel 78 are attached the side panels 80 by means of sewing, respectively.

Each of the side panels 80 has a ventilation hole 80a formed at a prescribed part thereof for discharging gas introduced into the cushion 58 to the outside. When the passenger contacts the cushion 58 due to the impact caused when a collision of the vehicle occurs, the gas in the cushion 58 is discharged to the outside through the ventilation hole 80a so that shock transmitted to the passenger from the cushion 58 is effectively absorbed.

The retainer 60 is attached to the can housing 68 together with the cushion 58 by means of bolts such that a gas-guiding hole 60a formed at the center of the retainer 60 communicates with the inlet part 62 of the cushion 58. The retainer 60 serves to support the cushion 58 so that the cushion 58 is not separated from the can housing 68 due to the pressure of the gas when the cushion 58 is expanded.

The diffuser bag 64 comprises: a main body 82 formed in the shape of a pocket and having a chamber 82a defined therein for receiving gas introduced through the inlet part 62 of the cushion 58; an inlet part 84 formed at the main body 82 while the inlet part 84 communicates with the inlet part 62 of the cushion 58; and a gas-discharging opening 86 formed at one side of the main body 82 for discharging the gas received in the main body 82 in a prescribed direction.

The main body 82 of the diffuser bag 64 comprises: an upper panel 88 forming the upper part of the main body 82; and a lower panel 90 disposed below the upper panel 88. The chamber 82a is defined between the upper panel 88 and the lower panel 90.

The upper panel 88 and the lower panel 90 are preferably made of a fibrous material.

The upper panel 88 and the lower panel 90 are sewn to each other at their outer edges so that the upper panel 88 and the lower panel 90 are securely attached to each other.

Figure 8:
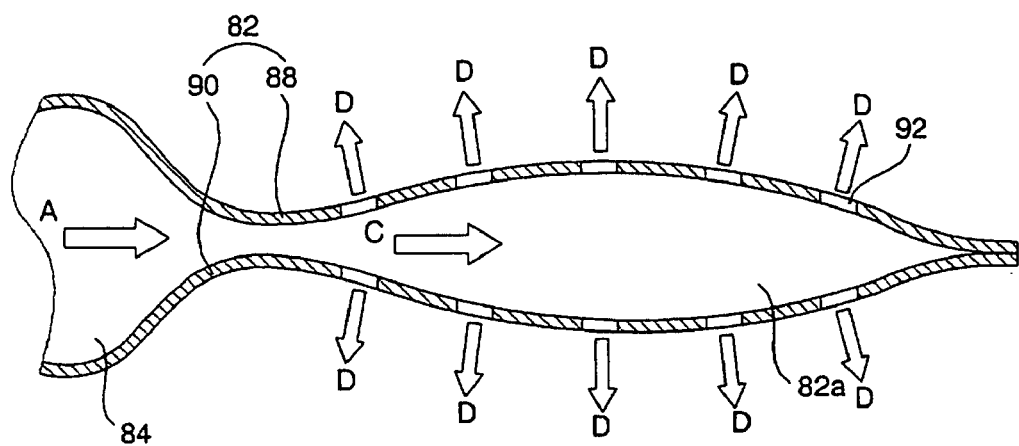
FIG. 8 is a longitudinal sectional view illustrating the operation of a diffuser bag of the passenger air bag system, which includes a plurality of gas-discharging holes, according to the preferred embodiment of the present invention.

At the upper panel 88 is formed a gas-discharging hole 92, and at the lower panel 90 is formed another gas-discharging hole 92, which corresponds to the gas-discharging hole 92 of the upper panel 88. Consequently, the gas introduced into the diffuser bag 82 through the inlet part 84 is discharged to the cushion 58 through the gas-discharging holes formed at the upper panel 88 and the lower panel 90. The gas-discharging holes may be formed in large numbers at the upper panel 88 and the lower panel 90, if necessary, as shown in FIG. 8.

The inlet part 84 is defined between one end of the upper panel 88 attached to the upper side of the inlet part 62 of the cushion 58 and one end of the lower panel 90 attached to the lower side of the inlet part 62 of the cushion 58. The ends of the upper panel 88 and the lower panel 90 are attached to the inlet part 62 of the cushion 58 by means of sewing.

The upper panel 88 and the lower panel 90 are separated from each other at both sides of the upper and lower panels 88 and 90 adjacent to one end of the main body 82. In other words, the inlet part 84 is opened at both sides thereof. Consequently, the gas introduced into the diffuser bag 64 is initially discharged to the cushion 58 through the opened sides of the inlet part 84.

The gas-discharging opening 86 is formed at one side of the main body 82 for discharging the gas received in the main body 82 in a direction opposite to the direction in which the gas is discharged to the cushion 58 through the opened sides of the inlet part 84.

Specifically, the gas-discharging opening 86 is formed at the outer edges of the sewn upper and lower panels 88 and 90. The main body 82 is cut at the edge thereof, including the sewing lines of the upper and lower panels 88 and 90, to form the gas-discharging opening 86.

The gas introduced into the main body 82 is discharged to the cushion 58 in a prescribed direction through the gas-discharging opening 86 formed as described above. The pressure of the gas applied to the cushion 58 is maintained uniformly by means of the gas discharged to the cushion 58 through the gas-discharging opening 86. Consequently, the eccentric expansion of the cushion 58 is prevented when the cushion 58 is expanded.

At one side of the main body 82 adjacent to the inlet part 84 may be formed a pressure-releasing opening 94 for preventing increase of the pressure inside the main body 82 above the maximum permissible limit due to the gas introduced into the main body 82 through the inlet part 84. The pressure-releasing opening 94 is formed at the outer edge of the main body 82 where the upper panel 88 and the lower panel 90 are not attached to each other by means of sewing.

The pressure-releasing opening 94 is not necessary when the sewn parts of the upper panel 88 and the lower panel 90 are not torn due to the pressure of the gas introduced into the main body 82. However, recent air bag systems generally have increased capacities, and thus it is not possible for them to withstand the pressure of gas discharged from the inflator 56 by only sewing the upper panel 88 and the lower panel 90 at the outer edges thereof.

For this reason, the pressure-releasing opening 94 is preferably formed at one side of the main body 82 so that damage to the diffuser bag 64 is effectively prevented when the air bag system is operated.

Now, the operation of the passenger air bag system with the above-stated construction according to the present invention will be described in detail.

When a collision of the vehicle occurs, an operation signal is transmitted from the electronic control unit to the inflator 56 via the connecter (not shown). The inflator 56 is exploded by means of electric current supplied from the power supply terminal for discharging gas to the can housing 68 through the gas-discharging holes 70.

The gas discharged to the can housing 68 is introduced into the cushion 58 through the gas-guiding hole 60a of the retainer 60 and the inlet part 62 of the cushion 58. Consequently, the cushion 58 is expanded with prescribed pressure and speed by means of the gas introduced into the cushion 58.

When the cushion 58 is expanded, the instrument panel 52 is broken along the cut line 52a formed at the instrument panel 52, and then the cushion 58 is further expanded to the front of the passenger seat so that shock transmitted to the passenger seated in the passenger seat is effectively absorbed.

As described above, only a single gas-guiding hole 60a is formed at the center of the retainer 60. As a result, the retainer 60 does not cause flow resistance when the gas discharged from the inflator 56 passes through the inlet part 62 of the cushion 58.

Consequently, the flow speed of the gas discharged from the inflator 56 is increased, whereby the expansion speed of the cushion 58 is improved, and the full expansion time of the cushion 58 is reduced.

The inflator 56 is horizontally disposed in the can housing 68, and the gas-discharging holes 70 of the inflator 56 are provided adjacent to one end of the inflator 56. As a result, the gas A discharged through the gas-discharging holes 70 of the inflator 56 eccentrically flows toward the inlet part 62 of the cushion 58.

The gas eccentrically flowing in one direction as described above is introduced into the cushion 58 through the inlet part 62 of the cushion 58, and then supplied to the diffuser bag 64 fixed to the inlet part 62 of the cushion 58. The gas A supplied to the diffuser bag 64 is introduced into the chamber 82a defined in the main body 82 of the diffuser bag 64 through the inlet part 84.

The gas A passing through the inlet part 84 is discharged in the lateral direction B through the opened sides of the inlet part 84. The gas C, which is not discharged through the opened sides of the inlet part 84, flows along the chamber 82a defined in the main body 82 of the diffuser bag 64.

The gas C flowing along the chamber 82a defined in the main body 82 of the diffuser bag 64 is discharged in the upward and downward directions D through the gas-discharging holes 92 formed at the upper panel 88 and the lower panel 90 of the main body 82. At the same time, the gas C is discharged in a prescribed direction E through the gas-discharging opening 86.

In brief, the gas A is discharged in the lateral direction B through the sides of the inlet part 84, is discharged in the upward and downward directions D through the gas-discharging holes 92, and is discharged in the direction E opposite to the direction in which the gas is eccentrically introduced through the gas-discharging opening 86.

Consequently, the pressure of the gas is uniformly applied to the cushion 58 by means of the gas discharged in the direction E through the gas-discharging opening 86, whereby the eccentric expansion of the cushion 58 is prevented when the cushion 58 is expanded. In other words, the cushion 58 is accurately expanded according to the optimum expansion shape.

In the case of providing the pressure-releasing opening 94 having an appropriate size at one side of the main body 82 adjacent to the inlet part 84, it is possible to prevent an abrupt increase of the pressure inside the main body 82 of the diffuser bag 64 due to the gas discharged through the pressure-releasing opening 94.

As apparent from the above description, the present invention provides a passenger air bag system for vehicles which is capable of changing the flow direction of gas to the direction opposite to the direction in which a cushion is eccentrically expanded when the air bag system is operated by the provision of a diffuser bag so that the gas discharged from an inflator is uniformly introduced into the cushion by means of the diffuser bag. Consequently, the present invention has an effect of preventing eccentric expansion of the cushion.

As the eccentric expansion of the cushion is prevented as described above, the cushion is expanded according to the optimum expansion shape, whereby deterioration of performance of the passenger air bag system due to the incorrect expansion of the cushion is solved, and thus safety and reliability of the passenger air bag system are improved.

The eccentric expansion of the cushion is effectively prevented simply by controlling the shape of the diffuser bag. Consequently, the eccentric expansion of the cushion is prevented without difficulty, and thus the period of time required for developing air bag systems is reduced.

The gas introduced through the inlet part of the cushion is supplied into the diffuser bag, and the flow direction of the gas is changed by means of the diffuser bag so that the gas is discharged in all directions. Consequently, bag slip of the cushion is prevented when the cushion is expanded. For this reason, there is not required a tether, which is mounted in the cushion for preventing the bag slip of the cushion.

The present invention does not require molds used to adjust the shapes of gas-discharging holes of a retainer as compared to the conventional method for controlling shapes of the gas-discharging holes of the retainer so that the eccentric expansion of the cushion is prevented. Consequently, the cost of molding various retainers is eliminated, and maintenance of the molds is not necessary.

Furthermore, the flow of the gas is not interrupted by means of the retainer since only a single gas-guiding hole is formed at the center of the retainer, whereby the full expansion time of the cushion by means of the gas discharged from the inflator is reduced, and performance of the air bag system is improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A passenger air bag system for a vehicle, comprising:
an air bag housing mountable to a front of an instrument panel;
an inflator provided in the air bag housing to discharge gas when a collision of the vehicle occurs;

a cushion accommodated in the air bag housing such that the cushion is expanded toward a passenger seated in a passenger seat by the gas discharged from the inflator;

a retainer attached to the air bag housing to support the cushion;

a diffuser bag fixed to an inlet part of the cushion, the diffuser bag receiving gas through the inlet part of the cushion and comprising a plurality of gas-discharging holes formed at both sides thereof to discharge gas introduced thereinto into the cushion; and a single gas-guiding hole provided on the retainer;

wherein the diffuser bag further comprises:

a main body formed in the shape of a pocket to receive gas;

an inlet part formed at the main body to receive gas introduced into the main body therethrough; and a gas-discharging opening formed at one side of the main body to discharge gas received in the main body in a prescribed direction;

wherein the main body of the diffuser bag comprises:

an upper panel forming an upper part of the main body; and a lower panel attached to a lower side of the upper panel by sewing to define a chamber therein together with the upper panel;

wherein the upper panel has a gas-discharging hole formed therein, the lower panel has another gas-discharging hole formed therein, and the gas-discharging hole of the upper panel corresponds to the gas-discharging hole of the lower panel.

2. The system as set forth in claim 1, wherein the upper panel and the lower panel are sewn to each other at their outer edges.

3. The system as set forth in claim 1, wherein the upper panel and the lower panel are made of fibrous material.

4. The system as set forth in claim 1, wherein each of the upper panel and the lower panel comprises a plurality of gas-discharging holes.

5. The system as set forth in claim 1, wherein the entrance of the diffuser bag is defined between one end of the upper panel and one end of the lower panel.

6. The system as set forth in claim 5, wherein the ends of the upper panel and the lower panel are separated from each other.

7. The system as set forth in claim 6, wherein the ends of the upper panel and the lower panel are attached to the inlet part of the cushion by sewing.

8. The system as set forth in claim 1, wherein the gas-discharging opening is formed by cutting an edge of the diffuser bag.

9. The system as set forth in claim 8, wherein the main body of the diffuser bag is provided with a pressure-releasing opening to prevent from increasing pressure inside the main body above a prescribed limit.

10. The system as set forth in claim 9, wherein the pressure-releasing opening is formed at an edge of the main body of the diffuser bag.

11. The system as set forth in claim 10, wherein the pressure-realeasing opening is formed by not sewing the upper panel and the lower panel.

* * * * *